United States Patent [19]

Rogers

[11] Patent Number: 4,888,949
[45] Date of Patent: Dec. 26, 1989

[54] PROPULSION SYSTEM FOR A SMALL VEHICLE

[76] Inventor: Roy K. Rogers, 26575 Barns, Roseville, Mich. 48066

[21] Appl. No.: 182,541

[22] Filed: Jul. 18, 1988

[51] Int. Cl.⁴ .............................................. F16D 31/02
[52] U.S. Cl. ...................................... 60/434; 60/443; 60/487; 60/489; 60/494; 74/572; 180/165; 180/307
[58] Field of Search ................. 60/434, 433, 443, 444, 60/, 484, 487, 489, 490, 494; 180/165, 307; 74/572

[56] References Cited

U.S. PATENT DOCUMENTS

| | | | |
|---|---|---|---|
| 2,996,135 | 8/1961 | Grabow | 180/307 |
| 3,369,360 | 2/1968 | DeBiasi | 60/433 X |
| 3,805,676 | 4/1974 | Hamma et al. | 60/433 X |
| 4,131,171 | 12/1978 | Keyes | 180/165 X |
| 4,445,329 | 5/1984 | Drisko | 180/307 X |
| 4,730,154 | 3/1988 | Pinson | 74/572 X |

FOREIGN PATENT DOCUMENTS 639314 12/1936 Fed. Rep. of Germany ........ 60/433

*Primary Examiner*—Edward K. Look

*Attorney, Agent, or Firm*—Peter A. Taucher; David L. Kuhn

[57] ABSTRACT

The invention is vehicle propulsion system having a pump driven by an engine, a hydraulic motor driven by the pump, and a ground engaging wheel driven by the hydraulic motor. On the drive shaft connected between the engine and the pump is a flywheel whose moment of inertia is varied by radially translating weights on the flywheel. Under normal vehicle operating conditions, the weights are translated outward, whereby rotational energy is stored in the flywheel. When more power is needed then the engine can provide, the weights on the flywheel translate inwardly so that the flywheel imparts rotational energy to the pump through the drive shaft. The propulsion system has means to maintain the engine in a narrow r.p.m. range where the engine is most efficient. Vehicle speed and direction is varied by controlling the flow speed and direction from the pump, which determines the speed and direction of the hydraulic motor. The system also has an override mode wherein the engine speed is set at a new, higher level when a foot pedal operated by the vehicle operator exceeds a given range of movement.

10 Claims, 4 Drawing Sheets

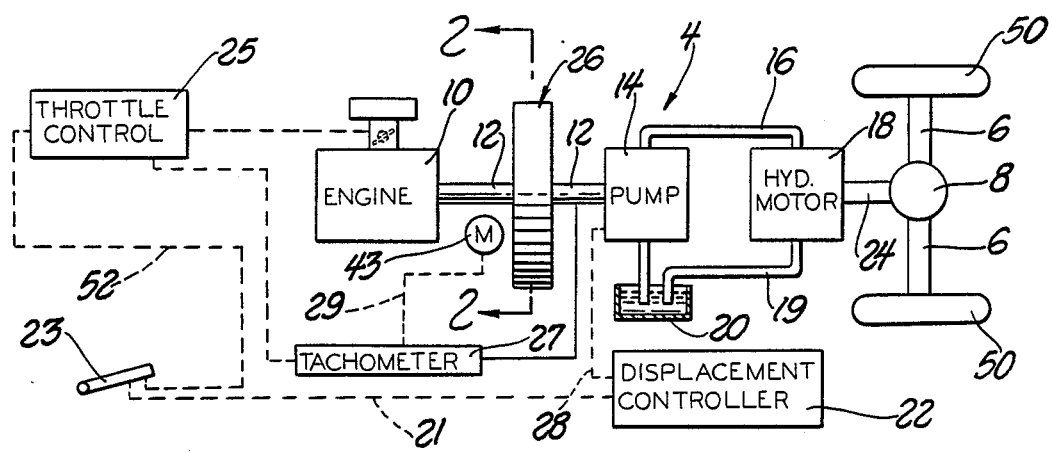
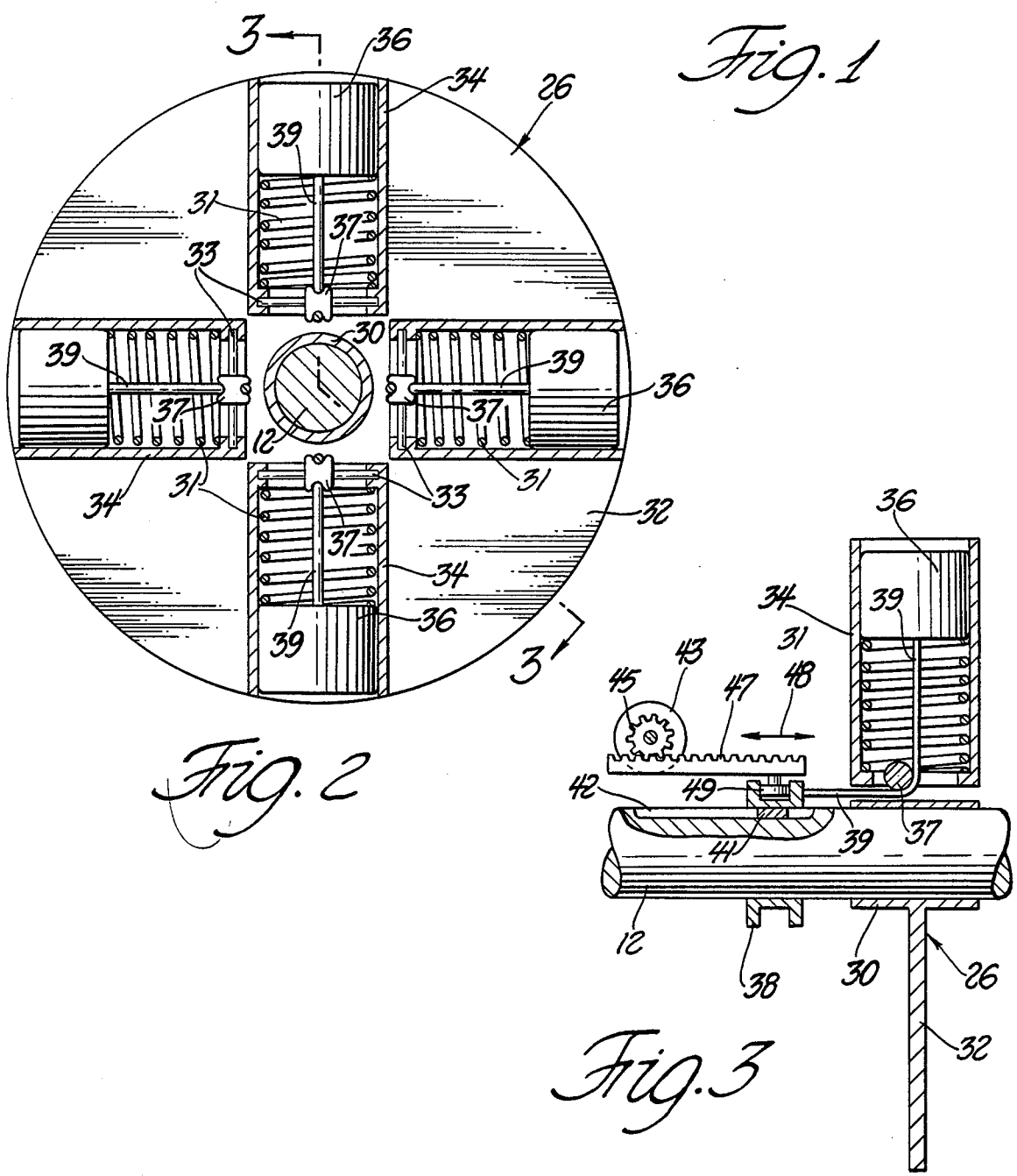

PROPULSION SYSTEM FOR A SMALL VEHICLE

GOVERNMENT INTEREST

The invention may be manufactured, used, and licensed by or for the United States Government for governmental purposes without payment to me of any royalty thereon.

BACKGROUND AND SUMMARY

My invention relates to the construction of the propulsion system of a vehicle. More particularly, the invention relates to the engine and drive train construction of small off-road military vehicles.

My propulsion system includes a relatively small internal combustion engine, a pump driven by the engine, at least one hydraulic motor driven by the pump, and at least one vehicle wheel driven by the hydraulic motor. The flow volume of the pump per revolution of the engine is controlled by a conventional swash plate in the pump. The swash plate is itself controlled by a lever, such as a foot pedal, mechanically linked to the swash plate. On the drive shaft connecting the engine and pump is a flywheel whose moment of rotational inertia is varied by radially translating weights on the flywheel. Under normal vehicle operating conditions, the weights are translated outward whereby rotational energy is stored in the flywheel. When more power is momentarily needed than the engine can provide, the weights on the flywheel translate inwardly so the flywheel imparts rotational energy to the pump through the drive shaft.

The invention includes a means for maintaining the engine at a relatively constant speed within the most efficient r.p.m. range for the engine. Vehicle speed and direction is varied by controlling the flow from the pump and thereby controlling the speed and direction of the hydraulic motor. The propulsion system has an override mode wherein the engine speed is set at a new, higher level when the foot pedal exceeds a given range of movement.

My invention is particularly useful in a small four-wheel-drive vehicle for accompanying foot soldiers across rough terrain with their equipment and supplies. This vehicle, commonly referred to as a mule, is preferably as light as possible so that it may be flown to the area of use by a cargo plane and parachuted directly into that area. Light vehicle weight not only increases air transportability of the mule but also reduces the impact shock it receives during a parachute landing. Light vehicle weight also increases the net payload which the mule can carry. Mules are preferably of simple and easily repairable construction since they often used in remote areas where repair facilities are not available and since the foot soldiers using the mules are typically not mechanically trained. From a logistical point of view, a simpler vehicle is more easily supplied and kept running in its field of operation.

As applied to the mule, my invention is a propulsion system which will reduce vehicle weight by using a smaller engine than is conventionally thought necessary. Vehicle weight and complexity is lessened by eliminating the torque transferring shaft between the vehicle axles and by eliminating differential gearing in the drive train. I estimate that the weight of mules used by the U.S. Army (approximately 960 lbs.) can be reduced by 300 to 400 lbs. with the propulsion system described herein. In one of the embodiments, it is possible to eliminate the steering mechanism on the U.S. Army mules to further lighten them and simplify their construction.

DESCRIPTION OF THE DRAWINGS

FIG. 1 is a semi-schematic view of my propulsion system having an energy storing flywheel.

FIG. 2 is a sectional view of the flywheel taken along line 2—2 in FIG. 1.

FIG. 3 is a sectional view along line 3—3 in FIG. 2.

DETAILED DESCRIPTION OF THE INVENTION

Figure 4:
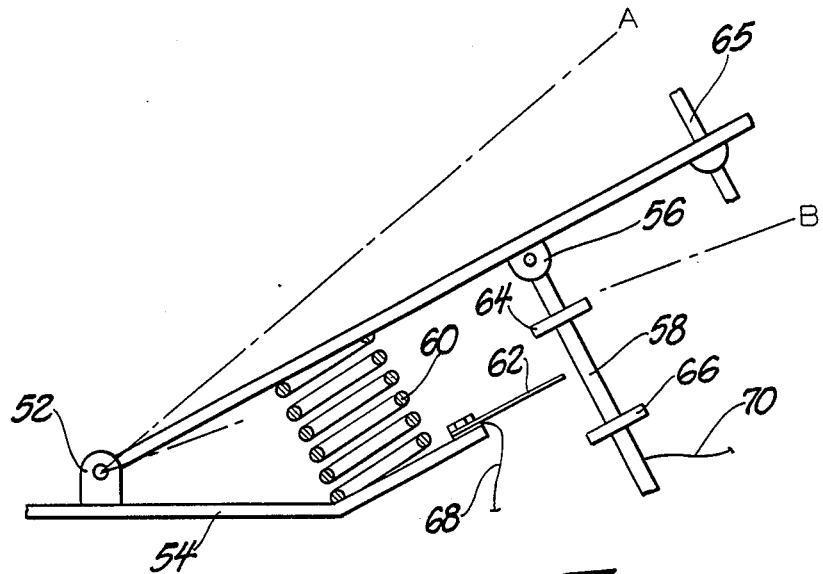
FIG. 4 is a pedal assembly used to control the hydraulic motor of a mule vehicle.

FIG. 1 shows my vehicle propulsion system 4 having a conventional internal combustion engine 10 turning drive shaft 12 extended therefrom. Engine 10 preferably has a rating of 4 to 6 h.p., as compared to the 13.6 h.p. engine presently used in U.S. Army mules. Connected at the opposite end of shaft 12 from engine 10 is a pump 14 driven by engine 12. Mounted on shaft 12 between engine 10 and pump 14 is flywheel 26, which will be described in greater detail later. Pump 14 drives hydraulic motor 18 by supplying pressure through line 16. Fluid exits motor 18 through hydraulic line 19 and drains into pump reservoir 20. Output shaft 24 of hydraulic motor 18 drives wheels 50 via a conventional gear mechanism 8 and axles 6. Preferably, wheels 50 are provided with low-pressure balloon tires (not shown) capable of absorbing impacts when the vehicle makes a parachute landing or travels over rough terrain. Such tires would eliminate the need for springs or shock absorbers mounted between the vehicle frame and the wheels 50.

Pump 14 is of the known variable volume type as shown, for example, in U.S. Pat. No. 3,898,917 to Adams. Typically, the pump includes a barrel rotatable by a drive unit (such as a gasoline engine) external to the pump. The barrel defines cylinders accommodating translatable pump pistons which are parallel to, and radially spaced from, the axis of rotation of the barrel. The pump has a fixed swash plate obliquely opposed to one end of the barrel and linked to the pistons so as to translate them back and forth once per barrel revolution. The angle between the swash plate and the rotational axis of the pump barrel controls the piston stroke length and hence controls the volume of fluid displaced per piston stroke. The swash plate also controls the volume of fluid exiting the pump per revolution. In applicant's device, the rotational speed of engine 10 and pump 14 is relatively constant, so the swash plate controls the flow rate from pump 14. This flow rate in turn controls the speed of motor 18. The swash plate and its connection to the pump pistons are schematically represented in FIG. 1 respectively as displacement controller 22 and dashed line 28.

The displacement controller is itself regulated by action of pedal 23, this action being translated to the displacement controller by a suitable mechanical linkage represented by dashed line 21. Pedal 23 is connected by circuit means 52 to throttle control 25 so that throttle control 25 increases the speed of engine 10 when pedal 23 pivots beyond a selected range of movement.

An example for the structural details of pedal 23 is shown in FIG. 4. There, pedal 23 has a pivotal connection 52 to floor 54 of a vehicle and is pivotally connected at 56 to link rod 58, which is part of mechanical linkage 21 leading to displacement controller 22. Pedal 23 is biased towards its FIG. 4 position by a spring 60 mounted on floor 54. Pedal 23 can be pivoted downward by the vehicle operator's foot and can be pivoted upward by the vehicle operator pulling upward on cable 65. Extending from the right edge of floor 54 in FIG. 4 is a flexible metal electrical contact 62 which engages annular ring portion 64 or 66 of link rod 58 when pedal 23 is pivoted beyond locations A or B. Wires 68 and 70 are respectively connected with contact 62 and link rod 58 to form circuit 52 with throttle control 25. Circuit 52 is closed when contact 62 engages annular ring portion 64 or 66. The circuit closure signals throttle control 25 to reset engine 10 at a new, higher speed.

Throttle control 25 regulates the amount of fuel received by engine 10 and responds to tachometer 27, which measures the angular velocity of drive shaft 12. The speed of engine 10 will be maintained in a relatively narrow range, for example, of 2600 to 2700 r.p.m., or whatever r.p.m. range is most suited for the engine used. Tachometer 27 also controls the operation of motor 43, which changes the position of moveable elements within flywheel 26.

As best seen in FIGS. 2 and 3, flywheel 26 is a disk-like structure fixed concentrically upon drive shaft 12 by means of sleeve 30. At equal angular intervals between webs 32 are elongate cylinders 34 whose longitudinal axes are disposed along radii of flywheel 26. Axially slideable within cylinders 34 are piston-like weights 36 which are preferably made of a relatively dense material. The weights are biased radially outwardly by coil springs 31 disposed between the weights and the axially inner ends of the cylinders. Also within cylinder 34 is a grooved bobbin 37 rotatable on rod 33 which lies parallel to the general plane of disk 36.

The mechanism for controlling the location of weights 36 of flywheel 26 includes a collar 38 spaced from flywheel 26 on drive shaft 12. Collar 38 is axially translatably connected to the shaft 12 by means of insert 41 slideable in drive shaft groove 42. Cables 39 extend from collar 38 through holes at the radially inner end of cylinder 34, then around bobbins 37 to weights 36, so that axial translation of collar 38 radially translates weights 36. Collar 38 defines a radially outwardly open groove at its periphery to accommodate a roller 49 on rack 47. Gear 45 of motor 43 translates rack 47 in the direction of arrows 48 to move collar 38 along groove 42 on drive shaft 12. Motor 43 is regulated by tachometer 27. When the speed of shaft 12 falls below a given value, motor 43 is actuated to pull weights 36 radially inwardly; when the speed of shaft 12 exceeds that given value, motor 43 is actuated to allow weights 36 to translate outwardly.

During normal operation of my vehicle propulsion system, engine 10 maintains drive shaft 12 (and pump 14) in a narrow range of rotational velocity of, for example, 2600 to 2700 r.p.m.. Motor 43 is set such that, at some value below this r.p.m. range, it allows weights 36 of flywheel 26 to translate to their outwardmost positions. The set value for the motor could be 100 r.p.m. less than the lower limit of the normal r.p.m. range for the engine (or 2500 r.p.m. in the example above). Weights 36 will thus be in their outwardmost, highest energy storage configuration during normal operation of the propulsion system. When shaft speed falls below 2500 r.p.m., weights 36 are retracted by motor 43, so that the kinetic energy of flywheel 26 is transferred to shaft 12 to increase shaft speed.

To change vehicle speed, the position of the swash plate in pump 14 is changed by lifting or depressing pedal 23. Movement of the swash plate changes the flow rate from pump 14 without changing the pump's rotational speed. This changed flow rate varies the speed of hydraulic motor 18 and hence the speed of the vehicle. A typical swash plate (as exemplified by U.S. Pat. No. 3,898,917) can also reverse the flow of pump 14 and thus reverse vehicle direction.

If the propulsion system experiences variations in load due to acceleration or a change in surface grade, throttle control 25 varies the flow rate of fuel to keep engine 10 within the aforementioned r.p.m. range. In cases of sudden, drastic load increases, the engine speed will fall below this range and reach the r.p.m. value where weights 36 of flywheel 26 are retracted. Flywheel 26 transfers kinetic energy to shaft 12 and thereby supplies torque to pump 14. Once the drastic load condition passes, engine 10 returns to its normal speed range and weights 36 of flywheel 26 return to their radially extended position.

The propulsion system has an "override" mode activated when pedal 23 exceeds a range of movement bounded by lines A and B in FIG. 4. Contact 62 engages one of annular ring portions 64,66 to complete electrical circuit 52 to throttle control 25. Throttle control 25 responds by accelerating engine 10 to a new, higher speed range (say 3700 to 4000 r.p.m.) and maintaining the new speed range as long as circuit 52 remains closed. Optionally, motor 43 may be preset to retract weights 36 of flywheel 26 when shaft 12 exceeds a given speed (3000 r.p.m., for example) so that flywheel 26 contributes kinetic energy to shaft 12 during the system's override mode. Alternatively, motor 43 may be provided with an electrical control mechanism communicating with circuit 52, so that when circuit 52 is closed by action of pedal 23, motor 43 is signalled to retract weights 36.

Figure 5:
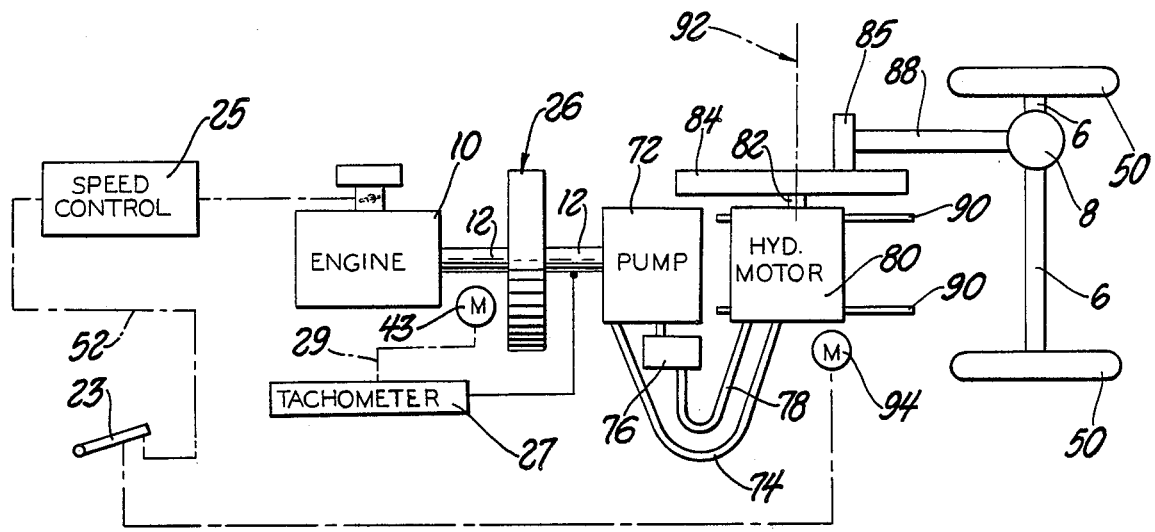
FIG. 5 is an alternate embodiment of my vehicle propulsion system.

FIG. 5 shows an alternate embodiment of my propulsion system having a different mechanism for varying vehicle speed than the FIG. 1 embodiment. Pump 72 is driven at constant speed by shaft 12 as in the previous embodiment. However, pump 72, unlike pump 14 in FIG. 1, is a simple pump having a fixed length of piston stroke and a fixed output volume per revolution of shaft 12. Pump 72 drives hydraulic motor 80 by supplying pressure through line 74. Hydraulic fluid from motor 80 returns to reservoir 76 of pump 72 through line 78. Extending from hydraulic motor 80 is shaft 82 which drives disk 84 and thereby rotates friction wheel 85. Preferably, shaft 82 is axially translatable outward from engine 80 and is biased towards frictional wheel 85. In this way, shaft 82 can move disk 84 to take up wear between friction wheel 85 and disk 84. Rotation of friction wheel 85 is transferred to wheels 50 through transfer shaft 88, differential 8, and axles 6.

Hydraulic motor 80 is translatable on rails 90 so that the centerline 92 of shaft 82 and disk 84 moves relative to friction wheel 85. When centerline 92 is left of friction wheel in FIG. 5, disk 84 rotates friction wheel 85 in a first direction; when centerline 92 is right of friction wheel 85, disk 84 rotates friction wheel 85 in the opposite direction. The translation of hydraulic motor 80, and hence centerline 92, is controlled by motor 94, which moves hydraulic motor 80 to a position on rails 90 corresponding to the angular position of pedal 23.

A third embodiment of my propulsion system (FIG. 6) is adapted for use with a vehicle, such as a mule, represented by the dashed rectangle 100. The body of the vehicle is preferably constructed of a light weight material such as aluminum. I wish it to be understood that speed control 25, tachometer 27, motor 43 and displacement controller 22 are included in my third embodiment, although these elements are not shown in FIG. 6. These elements are omitted from FIG. 6 for the sake of clarity in showing the structure particular to the third embodiment.

In the third embodiment, engine 10, drive shaft 12, flywheel 26 and pump 14 are the same as described in the previous embodiments. Hydraulic line 115 supplies fluid under pressure from pump 14 to valve assembly 95, which controls the flow of this fluid through lines 116 to four hydraulic motors 118. Valve assembly 95 may be in the form of a manifold having a manually closable, metered orifice (not shown) leading to each line 116. Each line 16 to the hydraulic motor 118 for a given wheel can be partly or fully closed should that wheel lose traction or become damaged.

Additionally, each line 116 may include at its entry end a flow sensitive control valve for closing the line when flow therethrough exceeds a predetermined rate. Any serious leak in a line 116 or motor 118 will increase the flow 116 past the control valve, whereupon the control valve closes line 116 to minimize the loss of hydraulic fluid.

Steering the vehicle may be accomplished by partly closing the hydraulic lines 116 for motors 118 on one side of the vehicle. This action effects a speed differential between wheels on opposite sides of the vehicle, so the vehicle turns toward the side with the slower wheels. The advantage of such an arrangement would be the elimination of the conventional steering linkage and consequent reduction in vehicle weight and complexity.

Each of motors 118 has a worm driver gear 96 extending therefrom into engagement with a complimentary driven worm wheel 97 on output shaft 124, which in turn rotates one of wheels 50. Each motor 118 also has a return line 119 by which hydraulic fluid flows back to the reservoir 20 (not shown in FIG. 6) of pump 14.

Figure 6:
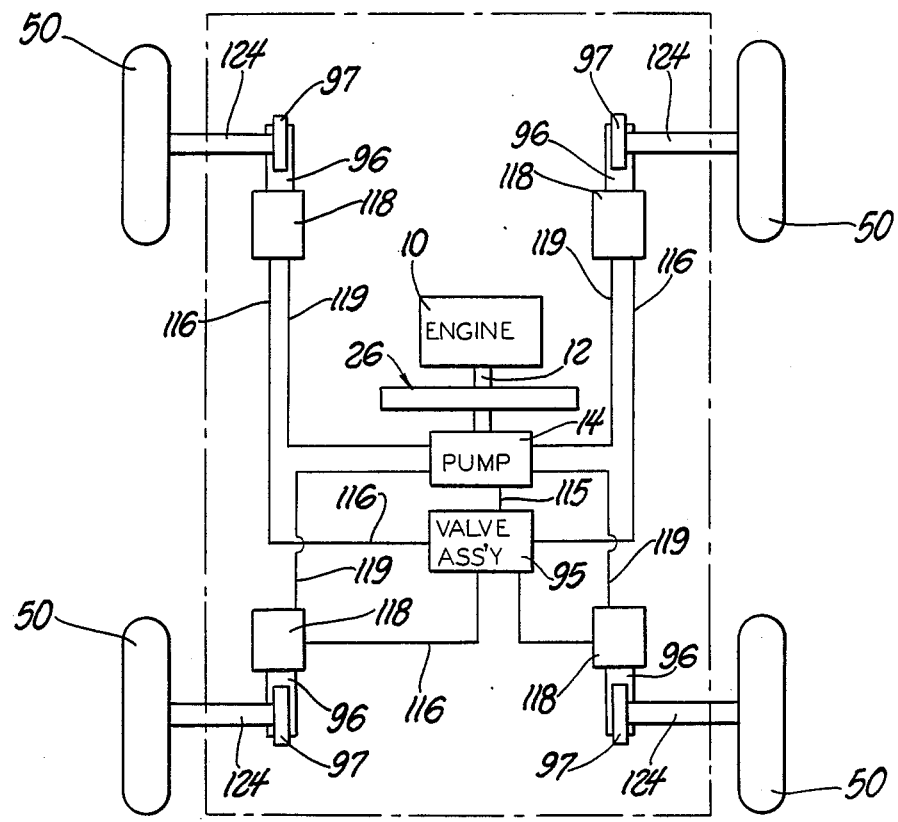
FIG. 6 and 7 show additional embodiments of my vehicle propulsion system.
Figure 7:
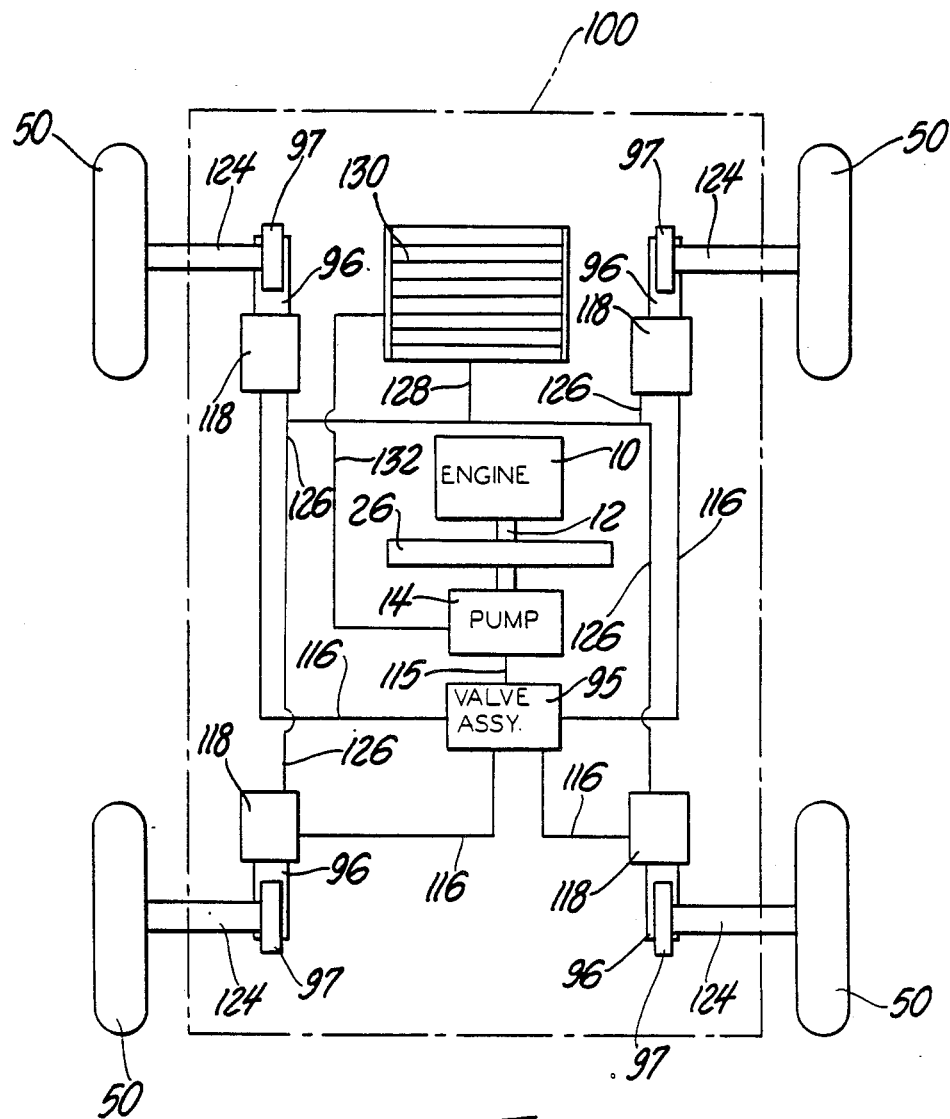

FIG. 7 shows a modification of the FIG. 6 embodiment wherein lines 126 lead from motors 118 to radiator feeder line 128, which conveys hydraulic fluid to radiator 130. Line 132 leads from radiator 130 to the intake side of pump 14. Radiator 130 cools the hydraulic fluid before it returns to pump 14. Preferably, radiator 130 has sufficient volume to act as a reservoir for pump 14 so that reservoir 20 is not needed.

I wish it to be understood that I do not desire to be limited to the exact details of construction shown and described for obvious modifications will occur to a person skilled in the art, without departing from the spirit and scope of the appended claims.

I claim:

1. A propulsion system for supplying power to a driven wheel of a vehicle comprising:
    an engine;
    a drive shaft extending from the engine;
    a hydraulic circuit including a pump connected to the drive shaft, whereby the engine drives the pump;
    means for varying the volume of fluid displaced by the pump per revolution of the drive shaft;
    a hydraulic motor in the circuit driven by the pump;
    an output shaft extending from the hydraulic motor for engagement with a driven wheel of a vehicle;
    a flywheel mounted on the drive shaft having weights radially slideable toward or away from the center of the flywheel;
    a flywheel regulator means for controlling the radial position of the weights with respect to the flywheel wherein the flywheel regulator means translates the weights radially inwardly when the drive shaft speed is below a selected value and translates the weights outwardly when the drive shaft speed exceeds the selected value;
    an engine regulator means for normally maintaining the drive shaft speed between upper and lower limits, said lower limit exceeding the selected value to which the flywheel regulator responds.

2. A propulsion system for supplying power to the driven wheel of an engine comprising an engine; a drive shaft extending from the engine; a hydraulic circuit including a pump connected to the drive shaft whereby the engine drives the pump; means for varying the volume of fluid displaced by the pump per revolution of the drive shaft; a hydraulic motor in the circuit driven by the pump; an output shaft extending from the hydraulic motor for engagement with a driven wheel of a vehicle; and an energy absorbing flywheel assembly mounted to the drive shaft for maintaining the drive shaft at a substantially constant speed during variations in torsional load on the drive shaft, the flywheel assembly including:
    a collar fixed on the drive shaft;
    a plurality of elongate guide members extending radially from the collar;
    a weight retained in each of the guide members slideable between the radially inner and outer ends of the guide members;
    means to bias the weights radially outwardly in the guide members;
    a cable guide means at the radially inner end of each of the guide members;
    a ring axially slideable on the shaft and rotatable therewith;
    a cable connected between the ring and each of the weights, the cables extending radially inwardly from the weights, thence around the cable guide means, and thence along the drive shaft to the ring;
    a means for translating the ring along the drive shaft to translate the weights radially;
    a tachometer means for controlling the translating means in response to drive shaft speed.

3. The propulsion system of claim 1 wherein the volume varying means includes a pivotable lever mechanically connected to the pump so that movement of the lever varies the flow rate from the pump per revolution of the drive shaft, the lever biased toward a rest position corresponding to an approximately zero flow rate from the pump, the lever being pivotable in a first angular direction from the rest position to increase the per-revolution flow rate from the pump in one flow direction, the lever also being pivotable in a second angular direction from the rest position to increase the per-revolution flow rate from the pump in the opposite flow direction.

4. The propulsion system of claim 3 including an electric circuit connected between the lever and the engine regulator means, the electric circuit including a limit switch having at least one electrical contact moveable in concert with the lever and engageable with another electrical contact fixed relative to the lever, whereby pivoting the lever beyond a given range of movement from the rest position closes the circuit, the engine regulator means having a reset means responding to closure of the circuit to maintain the engine and drive shaft at a new, higher speed than the aforementioned upper limit.

5. The device of claim 4 including means communicating with the electric circuit for signalling the flywheel regulator means to translate the weights toward the center of the flywheel in response to closure of the electric circuit.

6. The propulsion system of claim 2 wherein:
the drive shaft defines an axial slot;
the inner peripheral wall of the ring has a key projecting into the axial slot and the ring defines an outwardly open groove about its periphery;
the means for translating the ring includes a reversible motor controlled by the tachometer means, a rack translatable by the motor along the drive shaft, a spindle extending from the rack toward the outwardly open groove of the ring, and a roller rotatable on the spindle and engageable with the sidewalls of the radially outwardly open groove.

7. The propulsion system of claim 6 wherein the cable guide means includes an elongate pin disposed parallel to the general plane of the flywheel and perpendicular to radii of the flywheel, a bobbin rotatable on the pin and defining annular cable receiver channels concentric with the axes of the pins.

8. The propulsion system of claim 1 wherein:
the system is mounted in a vehicle having at least three wheels drivable independently of one another;
the propulsion system has at least three hydraulic motor driven by the pump, one hydraulic motor for each driven wheel of the vehicle;
the system includes a valve assembly downstream of the pump and upstream of the hydraulic motors for apportioning the flow from the pump among the hydraulic motors, the valve assembly including means to selectively shut off flow to one or more of the hydraulic motors.

9. The propulsion system of claim 8 wherein the vehicle has one drivable wheel on one side of the vehicle and another drivable wheel on the opposite side of the vehicle, the valve assembly operable to create a speed differential between the drivable wheels, thereby steering the vehicle in the direction of the slower drivable wheel.

10. The propulsion system of claim 9 wherein each hydraulic motor has a worm gear extending therefrom and each corresponding drivable wheel has a worm-driven wheel gear connected thereto, whereby actuation of the hydraulic motor rotates the corresponding drivable wheel.

* * * * *